Jan. 6, 1959     P. H. TAYLOR     2,866,999
METHOD AND APPARATUS FOR MAKING PLASTIC
SEAL MEMBERS FOR LIQUID SPRINGS
Filed March 16, 1954
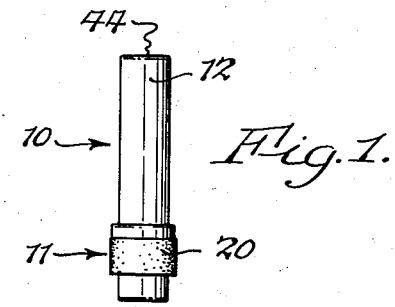
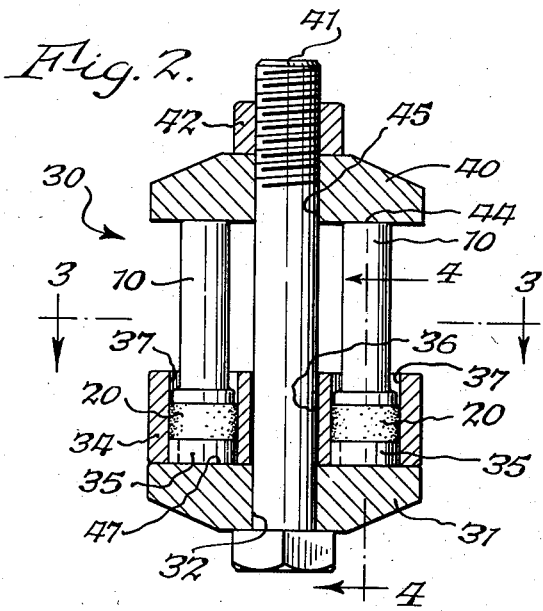
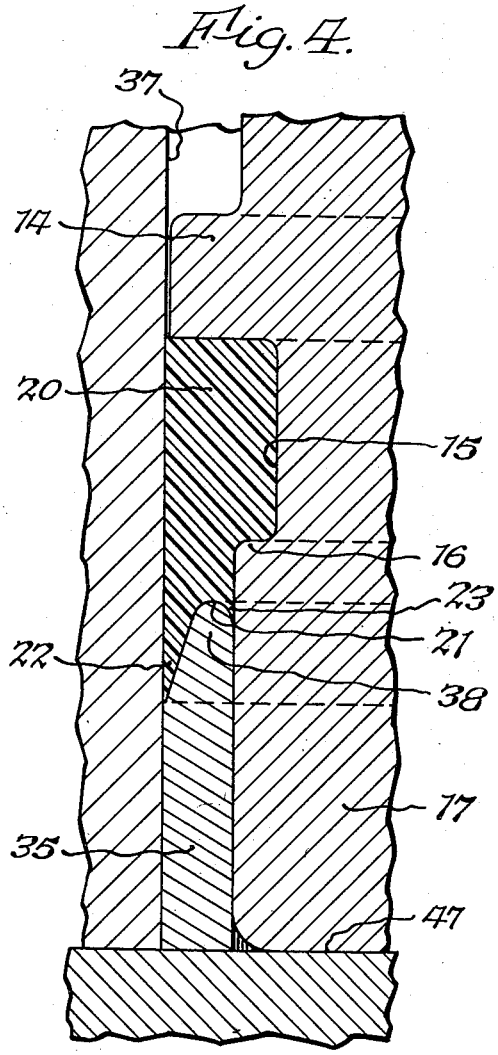
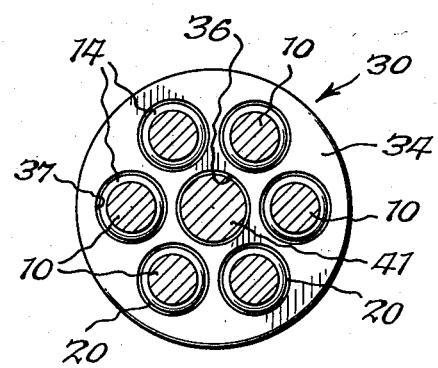
INVENTOR.
Paul H. Taylor
BY
Attorneys.

United States Patent Office 2,866,999
Patented Jan. 6, 1959

2,866,999

METHOD AND APPARATUS FOR MAKING PLASTIC SEAL MEMBERS FOR LIQUID SPRINGS

Paul H. Taylor, Grand Island, N. Y., assignor to Wales-Strippit Corporation, North Tonawanda, N. Y., a corporation of New York Application March 16, 1954, Serial No. 416,527

8 Claims. (Cl. 18—1)

The present invention relates generally to the production of high pressure liquid seals for use on reciprocal pistons that may be subjected to high pressure. In a more specific aspect, the invention relates to a seal suitable for use on the reciprocal piston of a liquid spring to seal against leakage along the piston of the highly compressible liquid used in the spring.

Seals have been a serious problem in most all high pressure liquid applications, but they are particularly critical in liquid springs where the compressibility of a confined liquid is utilized to effect the desired resilient spring action. Here the seal must be reciprocal; and it must effect to all intents and purposes substantially total sealing action between the reciprocating piston on which it is mounted and the cylinder in which the piston reciprocates; otherwise the liquid spring will not be commercially satisfactory. The stringency of the requirement for substantially total sealing is due primarily to the small bodies of liquid employed in liquid springs. In some cases as little as two ounces of liquid is used. For instance, in one typical application to a small liquid spring two ounces of liquid is compressible from 12% to 20% by volume at an operating pressure of as much as 50,000 lbs. per square inch by a piston having a diameter of ½ inch and a stroke of ¾ inch. Obviously, in such an installation, the loss of a few cubic millimeters of liquid will reduce the operating load of the spring, and render it inoperative for the purpose for which it was intended.

It will be obvious, therefore, that for a liquid spring to be of any commercial value, its piston seal must have a tight, leak-proof fit in the bore of the cylinder and must also be capable of sealing the liquid used in the spring against leakage for long periods of time, for instance, for a half million reciprocal strokes. This must be done not only under the tremendous pressures developed and despite the relative reciprocatory movement of the parts of the spring, but sometimes also under high operating temperatures and in hot, corrosive atmospheres.

The problem is further complicated by reason of the fact that liquid springs ordinarily use silicone base liquids, because such liquids have the desired compressibility of 20% at 50,000 lbs. p. s. i. Such liquids are in themselves, however, deleterious to friction free operation of steel within steel, for they tend to remove all natural oil films from the steel. It is necessary, therefore, to use on the piston of a liquid spring a plastic seal, made of a material, such as nylon, which is impervious to the silicone base liquid, in order to prevent sliding of the steel body of the piston on the steel cylinder wall in which the piston reciprocates. Otherwise, the cylinder and piston will score and be rendered inoperative.

As further examples of some of the problems to be met in the manufacture of reciprocal seals for liquid springs, it will be apparent that the tolerance of the bore in which the seal operates and the tolerance of the seal itself must be extremely close. Heretofore, in order to provide proper mating of the parts, a slight press fit tolerance between the seal and the bore of between .001" to .0006" interference has been used.

It is obvious that to have a bore closer than .0002" is a physical impossibility particularly when that bore must be held to a 2 to 4 micro inch finish, or better, in order to eliminate excessive wear on the reciprocating seal. With this close finish tolerance on the bore it is further obvious that in order to avoid exceeding the allowable tolerances with respect to the interference of the seal, it is necessary that the seal tolerance itself as finished, including that of the steel shank of the piston which passes therethrough, must not exceed .0002". Since, as stated above the outer tolerance of the piston bore cannot be held closer than .0002", this leaves no tolerance for the plastic seal.

Since plastics are by their very nature flexible, variable, and difficult to hold, the tolerances have been met by placing the seal, after manufacture, on the piston by a press fit, and then sizing the outside seal diameter to fit the tolerance of the bore. In this manner the interference tolerance between the bore and the nylon seal has been held. Obviously such a procedure of selective fits does not lend itself to a production setup and of necessity limits the sale of liquid springs because of the inability to mass produce them in the quantities required at a low enough cost.

For this reason, the method disclosed in my pending U. S. patent application Serial No. 350,054, filed April 21, 1953, now Patent No. 2,742,333 has been adopted. In this method the nylon seal is molded on the piston of the liquid spring in a die. Any plastic part, however, and particularly nylon, when it is molded in a die, shrinks from .0005" to .001" when removed from the die and allowed to cool. This shrinkage presents a serious problem, inasmuch as the wall of the seal must be absolutely straight and be within .0002" of being parallel to the cylinder wall. It has been very difficult to mold perfect seals. Furthermore, strains are set up in the nylon in the as-molded condition, because as the nylon cools it sets up strain lines to the still hot portion of the plastic. This, of course, builds up initial internal stresses in the plastic which in a liquid spring application is heavily stressed anyway.

In operation in a liquid spring an as-molded seal has, moreover, a tendency to move somewhat due to these internal stresses, and therefore to allow slight leakage. Furthermore, the lack of absolute parallelism in the seal causes the nylon, as it reciprocates, to present less than its full area to the steel cylinder wall since it contacts with the cylinder wall only at its high point. This also affects the sealing.

Basically nylon is a structural plastic which is not very elastic. Consequently this makes it that much more essential that the nylon seal be in absolute register with the cylinder wall throughout its entire sealing length. This requires an accuracy not obtained in conventional molding. It also requires that the plastic be stress-relieved of any strains set up due to heat and cold, and also that it be stress-relieved so that it can expand properly upon the application of pressure thereto.

A primary object of the present invention is to provide apparatus for and a method of manufacturing plastic seals for reciprocal pistons so that the seals will have substantially straight side walls parallel to the walls of the cylinders in which they reciprocate.

Another object of the invention is to provide apparatus for and a method of manufacturing a seal for a reciprocal piston of a liquid spring, which will have a wall that can completely register with the wall of the cylinder in which the piston operates.

A further object of this invention is to provide a method and apparatus for manufacturing seals for liquid springs which under the high pressure of operation will have zero leakage.

A further object of this invention is to provide a reciprocal plastic seal for a liquid spring which will not move when the spring is in operation, but will have full length bearing on the cylinder in which the piston operates.

A further object of this invention is to provide a method and apparatus for making a seal to true cylindrical shape while simultaneously densifying the material of the seal as well as improving its surface finish.

A further object of this invention is to provide a method and apparatus for remolding a previously-molded high pressure plastic seal for liquid springs so that the seal will be stress relieved and accurate.

Other objects of the invention will be apparent hereinafter from the description and from the recital of the appended claims.

In the drawing:

Fig. 1 is a side elevation of a liquid spring piston having a nylon seal molded thereon;

Fig. 2 is an axial section of the seal remolding fixture constructed according to one embodiment of this invention and illustrating the remolding of the seals of two liquid spring pistons;

Fig. 3 is a transverse sectional view of the seal remolding fixture taken on line 3—3 of Fig. 2 looking in the direction of the arrows; and Fig. 4 is an enlarged fragmentary axial section taken on line 4—4 of Fig. 2 and looking in the direction of the arrows.

The objects of the present invention are accomplished by remolding plastic seal members, after they have been initially molded, by reheating the seal members to a temperature slightly below the molding temperature of the material and in a die with a cavity slightly larger than the die used in the initial molding of the seal member, and applying pressure to the seal member to cause the plastic material to flow into the die cavity and be shaped with the desired accuracy while simultaneously being relieved of strains.

Referring now to the drawing by numerals of reference 10 denotes the piston of a conventional liquid spring. The spring is filled with a compressible liquid; and the piston 10 is designed to reciprocate in a cylinder forming part of the spring, so that, when a force is applied to the piston, the liquid of the spring is compressed, and when the force is relieved the liquid expands again, returning the piston to initial position.

To seal against leakage along the piston and to prevent scoring the cylinder wall as the piston reciprocates, the piston is provided, as previously stated, with a seal 11. The main portion of this seal is made of a dense, hard, plastic material, preferably one of the bearing nylons. A high strength, structural nylon is preferred because it has a low coefficient of friction, long life, some resiliency, and a slight compressibility to effect the necessary sealing.

The seals used are preferably of the type disclosed in my prior application above mentioned and in the pending application of Charles Lee Rovoldt, Serial No. 298,094, filed July 10, 1952, now Patent No. 2,708,573. Both these applications are assigned to the assignee of the present invention.

The piston 10 is formed with shank portion 12, a shoulder 14 (Fig. 4), a portion 15 of reduced diameter adjoining said shoulder, a seal retaining shoulder 16, and a base portion 17 that is of greater diameter than portion 15 but of less diameter than shoulder portion 14. The main body of the seal is as previously stated made of nylon or other dense, hard, plastic material and is preferably of the configuration shown at 20 in Fig. 4. It is molded to seat against the shoulder 14 and to surround the reduced diameter portion 15 of the piston and the adjacent portion of the base 17 of the piston, being held securely in the groove formed between shoulders 14 and 16. At its lower end the seal member 20 is grooved, as denoted at 21, to form an outside flexible lip 22 of considerable length and an inside flexible lip 23 of short length. The groove 21 is adapted to receive a rubber O-ring, as described in the Rovoldt application above mentioned. The O-ring serves to hold the lips 22 and 23 in engagement with the inside wall of the cylinder, in which the piston reciprocates, and with the base portion 17 of the piston, respectively.

For molding the seal member 20 on the piston 10 the process and apparatus disclosed in my prior application, Serial No. 350,054 is preferably employed.

As stated, any plastic part, and particularly nylon, shrinks as it cools. Hence, as the seal member 20 cools down from the hot molding operation, strains are set up in it and moreover it may be reduced in diameter and may vary from true cylindrical shape. Since variations of as much as .0003" in diameter can cause serious leakage or wear of the seal, and since nylon shrinks from .005" to .001" as it cools, we are faced with a very serious problem to make a seal that will prevent leakage along the reciprocating piston of a liquid spring.

To overcome the drawback of the basic molding process of my application Serial No. 350,054 above mentioned, and to provide a seal of improved accuracy and life I propose to remold the plastic seal members, after initial molding by a process such as disclosed in application Serial No. 350,054, thus to relieve the strain in the seal members and make them truly straight in axial profile and of correct diameter so that they will bear along their whole lengths on the walls of the cylinders in which they are used.

A seal remolding and resizing fixture made according to the present invention for practicing the process of the present invention is shown at 30 in Figs. 2, 3 and 4. This fixture comprises a generally cylindrical base member 31 having a central aperture or bore 32 therethrough, a cylindrical die 34, and a plurality of equi-angular spaced molding or die rings 35.

The die 34 rests on the top of the base member 31 and made be welded or otherwise secured thereto. It has a central aperture or bore 36 therethrough that registers with the bore 32 in the base member 31. The die 34 also is formed with a plurality of die or molding cylinders 37 that extend therethrough and that are equi-spaced angularly about the central aperture 36. These are made slightly larger than the diameter of the nylon sealing sleeve 20 as molded so that the sealing sleeve will be free to expand therein, when heated, to relieve its internal stresses.

The die or molding rings 35 are intended to preserve the grooves 21 in the sealing sleeves during the remolding and resizing operation. To this end each ring 35 has a rounded top portion 38 of generally inverted V-shape to fit into and receive the groove 21 of a sealing sleeve. The die or molding rings 35 are equi-angularly spaced about the aperture 36 and are coaxial with the die cylinders 37. They are fixed to the base 31, as by welding, to be disposed within the several die cylinders 37. The bore of each die ring 35 is of a diameter to snugly receive the base portion 17 of a piston 10 to rigidly hold the piston during the remolding and resizing operation.

The remolding fixture is adapted to hold as many pistons 10 as there are molding cylinders 37 in the die 34, in the case illustrated, six. The pistons 10, whose seals 20 are to be remolded, are placed in the die 30 with their base portions 17 fitting into the die rings 35 and with the tops 38 of the die rings 35 receiving and fitting into the grooves 21 of the seal members 20. Then the pistons are seated snugly against the upper face 47 of the base member 31, and the seal members 20 are forced down into the die rings 35 by application of pressure to the pistons. This pressure may be applied by a block 40, bolt 41, and nut 42. The clamping block 40, which may be generally cylindrical in shape, engages the top surfaces 44 of the pistons 10. The bolt 41 passes through the aligned holes 32 and 36 in base member 31 and die 34, respectively, and through a central hole or bore 45 in the clamping block 40. Nut 42 threads onto bolt 41 to apply pressure to the seal members 20. The base member 31 and clamping block 40 are preferably made of aluminum for lightness and ease of handling and also because aluminum is a good heat conductor.

In the practice of my invention, after the seal members 20 have been molded on the pistons 10 by the process, for instance, of my application Serial No. 350,054, and have been cooled, the pistons are assembled in the remolding fixture of the present invention; and the nut 42 is threaded down until the pistons are snug with approximately 20" lb. torque against the seats 47 (Fig. 4) and until approximately 25" lb. torque is applied to the cold seals 20 themselves. The assembly is then dropped into a hot oil bath having a temperature somewhat under the molding temperature of the nylon or other plastic used in the sealing member. After the nylon has reached the temperature of the bath the fixture is removed from the hot oil and a torque wrench is used to apply 45" lbs. of pressure to the seal members 20 again. The fixture with the pistons therein is then returned to the hot oil bath again for a short period of time, after which it is cooled in water, and the pistons are removed. The seal is resized and reformed in this fashion to the size and shape desired.

Preferably the bores of the cylinders 37 are made approximately .005" larger than the diameter of the sealing members 20 in their as-molded form. With the apparatus of this invention, then, the size of the seals can be increased to compensate for and offset the shrinkage occurring as the sealing members cool after the initial molding operation. At the same time the sealing members are made absolutely accurate; and all internal stresses and strains in them are relieved. Moreover, because of the pressure exerted on them in the remolding operation they are densified and their surface finish is improved. Thus, they will have longer life than plastic seal members that are molded only, and not subjected to the remolding operation of the present invention.

The temperature of the hot oil bath used in remolding will depend, of course, upon the material of the sealing members. For instance, if the molding temperature of the nylon used is 350° F., the hot oil bath employed in the remolding operation will have a temperature of approximately 300° F. At such a temperature the nylon can be hot formed to a new configuration providing the new configuration is but slightly different from its previously molded configuration.

With the present invention, then, a remolding process is provided in which the piston with the plastic sealing member molded thereon is placed in a die cavity which is slightly larger than the cold plastic sealing member, the sealing member is put under pressure, then heated while it is held under pressure to soften the plastic, and then further pressure is applied so that the plastic will flow into the cavity and be shaped to the desired accuracy while being simultaneously relieved of internal strains and stresses.

While the invention has been described in connection with a particular embodiment thereof, it will be understood that it is capable of further modifications and uses, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of resizing a plastic seal that is molded around a reciprocal piston and that as molded is of greater diameter than the adjoining parts of the piston, which comprises placing the piston with the seal thereon in a die having a cylindrical die cavity of larger diameter than the as-molded diameter of the seal, applying axial pressure to the seal while containing the seal against radial and axial movement relative to the piston, heating the seal up to a temperature below the molding temperature of the plastic but high enough to soften the plastic so that it can be reformed, and increasing the axial pressure on the seal to expand it in diameter to fill the die cavity and to densify it.

2. The method of resizing a plastic seal that is molded around a reciprocal piston and that as molded is of greater diameter than the adjoining parts of the piston, which comprises placing the piston with the seal thereon in a die having a cylindrical die cavity of larger diameter than the as-molded diameter of the seal, applying axial pressure to the seal while confining the seal against radial and axial movement relative to the piston, heating the seal up to a temperature below the molding specific temperature of the plastic but high enough to soften the plastic to permit reforming it, and increasing the axial pressure on the seal to expand it in diameter to fill the die cavity, then reheating the seal to said specific temperature, and cooling it.

3. The method of resizing a plastic seal that is molded around a reciprocal piston and that as molded is of greater diameter than the adjoining parts of the piston, which comprises placing the piston with the seal thereon in a die having a cylindrical die cavity of larger diameter than the as-molded diameter of the seal, centering the piston in the die cavity and seating the seal at one end therein, applying axial pressure to the piston thereby to apply radially outward pressure to the seal, heating the seal up to a temperature below the molding temperature of the plastic but high enough to soften the plastic for reforming it, and then increasing the axial pressure on the piston to cause the seal to expand in diameter to the diameter of the cavity along the length of the seal.

4. The method of resizing a plastic seal that is molded around a reciprocal piston and that as molded is of greater diameter than the adjoining parts of the piston, which comprises placing the piston with the seal thereon in a die having a cylindrical die cavity of larger diameter than the as-molded diameter of the seal, applying radially outward pressure to the seal, and plunging the die with the piston therein into a hot liquid bath whose temperature is below the molding temperature of the plastic but high enough to soften the plastic for reforming it to expand the seal in diameter to the diameter of the cavity along the length of the seal.

5. The method of resizing a plastic seal that is molded around a reciprocal piston and that is seated at one end against a shoulder on the piston and that as molded is of greater diameter than the adjoining parts of the piston, which comprises placing the piston with the seal thereon in a die having a cylindrical die cavity of larger diameter than the as-molded diameter of the seal, applying axial pressure to the other end of the seal so as to force the seal to expand radially outward, and plunging the die with the piston therein into a hot liquid bath whose temperature is below the molding temperature of the plastic but high enough to soften the plastic for reforming it to expand the seal in diameter to the diameter of the cavity along the length of the seal, removing the die and piston from the bath after a predetermined time, increasing the radially outward pressure on the seal, again plunging the die and piston in said bath, and after a predetermined length of time, less than the first-named predetermined time, removing the die and piston from the bath, and cooling the seal and to densify the seal.

6. The method of resizing a plastic seal that is molded around a reciprocal piston and that as molded is of greater diameter than the adjoining parts of the piston, and that has a groove in its lower face, which comprises seating and centering the piston in a die, which has a cylindrical die cavity and which has a portion disposed to enter said groove, and while holding the seal at its upper face against upward axial movement relative to the piston, moving the piston axially to apply pressure on said lower face of the seal, and heating the seal to a temperature below the molding temperature of the plastic but high enough to soften the plastic for reforming it, and increasing the axial pressure on the piston to expand the seal to the diameter of the die cavity along the length of the seal.

7. A resizing and remolding fixture for a plastic seal that has been molded around a reciprocal metallic piston at a distance from one end of the piston and that has a circular groove in one end thereof, comprising a die having a cylindrical die cavity adapted to receive said piston, said die cavity having having a diameter larger than the as-molded diameter of said seal, a ring at the base of said cavity shaped to enter into said groove, and means for securing the piston in the die and for applying pressure between said piston and said ring axially of said piston.

8. A resizing and remolding fixture for plastic seals that have been molded around reciprocal metallic pistons and each of which has a circular groove in one end thereof, comprising a die that has a plurality of cylindrical die cavities spaced equi-angularly about a common axis and adapted to receive a plurality of said pistons, a seat in each cavity against which one end of a piston is adapted to seat, a ring in each cavity shaped complementary to said circular grooves and against which the circular groove in the seal on a piston seats, a clamping disc for engaging the opposite ends of the pistons distal from said grooves, and a bolt and nut for adjusting said disc toward said die to apply pressure by means of said rings to said seals.

References Cited in the file of this patent

UNITED STATES PATENTS

| | | |
|---|---|---|
| 1,461,299 | Wehn | July 10, 1923 |
| 2,041,518 | Salz | May 19, 1936 |
| 2,428,697 | Champer | May 22, 1943 |
| 2,516,373 | Ehlert et al. | July 25, 1950 |
| 2,525,972 | Stott | Oct. 17, 1950 |
| 2,733,478 | Schwieger | Feb. 7, 1956 |